(12) United States Patent
Ueda et al.

(10) Patent No.: US 7,777,446 B2
(45) Date of Patent: Aug. 17, 2010

(54) METHOD AND APPARATUS FOR CALCULATING BATTERY STATE AND APPARATUS FOR CONTROLLING POWER VOLTAGE IN VEHICLE

(75) Inventors: Kenji Ueda, Nagoya (JP); Atsushi Hashikawa, Okazaki (JP); Shoji Sakai, Toyota (JP); Satoru Mizuno, Okazaki (JP); Akira Kato, Anjo (JP); Katsunori Tanaka, Haguri-gun (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 694 days.

(21) Appl. No.: 11/700,183

(22) Filed: Jan. 31, 2007

(65) Prior Publication Data

US 2007/0182385 A1    Aug. 9, 2007

(30) Foreign Application Priority Data

Jan. 31, 2006    (JP) .............................. 2006-022303

(51) Int. Cl.
H02J 7/00    (2006.01)
H02J 7/14    (2006.01)

(52) U.S. Cl. ........................ 320/104; 320/132; 320/134; 324/426; 324/427

(58) Field of Classification Search .................. 320/104, 320/132, 134; 324/426, 427
See application file for complete search history.

(56) References Cited

U.S. PATENT DOCUMENTS 5,280,231 A    1/1994    Kato et al.
5,412,323 A *  5/1995    Kato et al. ................... 324/429
5,684,383 A * 11/1997    Tsuji et al. ................... 320/134
5,703,469 A * 12/1997    Kinoshita .............. 340/636.19
6,268,712 B1 *  7/2001    Laig-Horstebrock et al. ..... 320/132
6,646,422 B2 * 11/2003    Hogari et al. ................ 320/134
2003/0094321 A1 *  5/2003    Hirata et al. ................ 180/65.2
2004/0008031 A1 *  1/2004    Arai et al. ................... 324/429
2007/0182385 A1 *  8/2007    Ueda et al. .................. 323/211

FOREIGN PATENT DOCUMENTS

| JP | A 4-229030 | 8/1992 |
| JP | A 9-243716 | 9/1997 |
| JP | A 2003-249271 | 9/2003 |

* cited by examiner

*Primary Examiner*—Edward Tso
*Assistant Examiner*—Samuel Berhanu
(74) *Attorney, Agent, or Firm*—Oliff & Berridge, PLC

(57)    ABSTRACT

An apparatus is provided to control a power voltage on a power-supplying line extending from a generator and connecting to a battery and eclectic loads. The apparatus is mounted on a vehicle and comprises a detecting device, a calculator, and a controller. The detecting device detects pairs of voltage and current of the battery. The calculator calculating a control current on the basis of the detected pairs of voltage and current and a target voltage for the power voltage. The pairs of voltage and current are used to calculate an internal resistance and/or a regression line of the battery. The controller controlling a charge and discharge current of the battery on the basis of the control current so that the power voltage is controlled to the target voltage.

14 Claims, 10 Drawing Sheets

US 7,777,446 B2

METHOD AND APPARATUS FOR CALCULATING BATTERY STATE AND APPARATUS FOR CONTROLLING POWER VOLTAGE IN VEHICLE

CROSS REFERENCES TO RELATED APPLICATION

The present application relates to and incorporates by reference Japanese Patent application No. 2006-22303 filed on Jan. 31, 2006.

BACKGROUND OF THE INVENTION

1. Field of the Invention

The present invention relates to a method and apparatus for calculating physical quantities indicative of internal states (such as charged states) of a secondary (rechargeable) battery to be mounted in a vehicle and an apparatus controlling power voltage in a vehicle, and in particular, the method and apparatus that perform calculation using a plurality of pairs of voltage/current data detected from the battery.

2. Description of the Related Art

On-vehicle battery systems usually use secondary batteries such as lead batteries. In those batteries, it is required to estimate their internal charged states for capacity control and safety control. Conventionally, for those purposes, various types of apparatuses have been provided, which estimate physical quantities indicative of internal charge states of a battery. Such physical quantities are for example the voltage, current, residual capacity, open-circuit voltage and internal resistance of a battery, which will now be called "battery-state quantities" in the following description.

Those estimation apparatuses are characteristic of having a common configuration. That is, many pairs of sampled data of voltage and current are measured as input parameters from a battery, the sampled paired data are used to estimate a relationship between the voltage and the current, and the relationships are for estimating the battery-state quantities.

However, the relationship between the voltage and the current cannot be defined as being simply linear, because there are many physical phenomena that affect the relationship. Such phenomena include the residual capacity, temperature, deteriorated degree, and polarized degree of a battery.

One conventional technique for estimating the relationship between the voltage and the current is to use a regression line. Specifically, a large number of paired data of sampled voltage/current are used to plot voltage (V) and current (I) in a two-dimensional coordinate such that a regression line is produced in the coordinate. This regression line is used to estimate a current value corresponding to a voltage value being inputted or estimate a voltage value corresponding to a current value being inputted. This technique is known as a "regression-line based technique," which has now been used widely. The slope of a regression line means a value of the internal resistance of a battery.

Other techniques have also been proposed, which are shown in for example Japanese Patent Laid-open Publication Nos. 9-243716 and 2003-249271. These published documents propose how to estimate some battery-state quantities (such as SOC and SOH) serving as output parameters by applying a large number (i.e., a plurality) of pairs of sampled voltage/current data and other battery-state quantities (such as temperature and operating hours) to a neural network. This technique is referred to as a "neural-network based technique."

However, both conventional regression-line based and neural-network based techniques are still confronted with some difficulties. When the regression-line based technique is used, estimated results of battery-state quantities have large errors. This is due to the fact that the coordinates of a large number of sampled voltage/current pairs are widely dispersed in the two-dimensional coordinate space. The dispersion of the coordinates results in giving a lowered precision to a regression line being estimated.

Meanwhile, for using the foregoing neural-network based technique, amounts of calculation load to a processor increases largely, compared to a case in which regression-line based technique is used. Of course, the processor itself becomes large in size. Nevertheless, this technique has not produced fully satisfactory calculated results yet.

By the way, there is a further difficulty, which should be resolved, between control of power voltage (battery voltage) and changes in the internal charge state of a battery. In the on-vehicle power-supply system, large fluctuations in the power voltage will cause various problems, such as instability of operations of loads, flickering of headlights, and a decrease in the lifetime of a battery. Thus it is strongly demanded to stabilize the power voltage (battery voltage) even when the amount of loads to be powered changes. In conventional vehicles, feedback control is generally done so that a difference between a detected power voltage value and a target voltage value converges to zero. The power voltage controlled on the feedback manner will however cause changes in the internal state of the battery, thus bringing about hunting of the power voltage and/or delay of the control. Therefore the stabilizing control of the power voltage which is in response to sudden changes in the power voltage (, which are due to changes in the electric loads) cannot be performed.

SUMMARY OF THE INVENTION

The present invention has been completed with the above view in mind and has an object to raise accuracy in calculating electric quantities indicating the internal states of a battery mounted in a vehicle and/or to control power voltage in a vehicle in a quick, stable and accurate manner.

In order to achieve the object, as one aspect, the present invention provides an apparatus for controlling a power voltage (VL) on a power-supplying line (5) extending from a generator (7, 7A) and connecting to a battery (1) and eclectic loads (L), the apparatus being mounted on a vehicle (VE), the apparatus comprising: a detecting device (6, 6A) detecting pairs of voltage and current of the battery; a calculator (3) calculating a control current on the basis of the detected pairs of voltage and current and a target voltage for the power voltage; and a controller (2, 7B) controlling a charge and discharge current of the battery on the basis of the control current so that the power voltage is controlled to the target voltage.

As another aspect, the present invention provides an apparatus for calculating an electric quantity indicating a state of a battery (1) being mounted on a vehicle (VE), the battery being connected via a line (5) to a generator (7, 7A) and electric loads (L), the apparatus comprising: a detecting device (6, 6A) detecting pairs of voltage and current of the battery; and a calculator (3) configured to calculate a first regression line on the basis of the pairs of voltage and current, determine whether or not the first regression line is sufficient or not; shift the first regression line to a second regression line based on a pair of voltage and current measured through the detecting device, if it is determined that the first regression line is not sufficient; and calculate an electric quantity based on the second regression line.

Still as another aspect, the present invention provides a method of calculating an electric quantity indicating a state of a battery (1) being mounted on a vehicle (VE), the battery being connected via a line (5) to a generator (7, 7A) and electric loads (L), the method comprising steps of: determining whether the battery is in a discharge state or in a charge state; selecting one regression line (RG1, RG2, RG3 or RG4) depending on a determined result by the determining step, from a plurality of types of regression lines prepared beforehand depending on the battery is in the discharge state or the charge state; and calculating the electric quantity by using the selected one regression.

In the present invention, by way of an example, the electric quantity indicating a state of a battery is calculated based on the regression line. In this case, the regression line should be construed broadly, i.e., the term "regression line" includes characteristic functions, such as an internal resistance of the battery, which define the regression line itself.

DETAILED DESCRIPTION OF PREFERRED EMBODIMENTS

Various embodiments of an on-vehicle power supply system according to the present invention will now be described with reference to the accompanying drawings.

First Embodiment

Referring to FIGS. 1-7, a first embodiment of the on-vehicle power supply system will now be described. This on-vehicle power supply system is configured based on how to calculate battery-state quantities according to the present invention.

Figure 1:
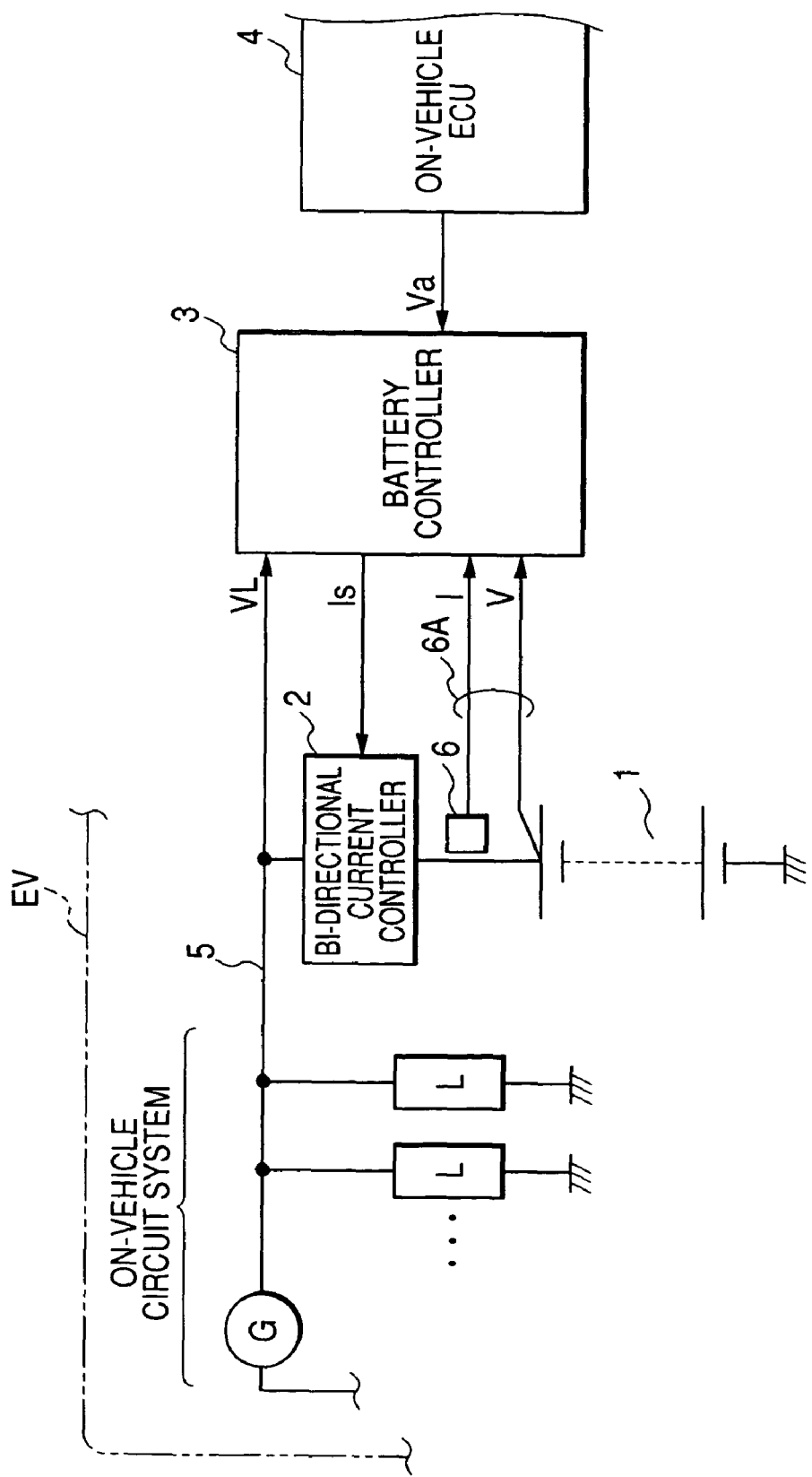
FIG. 1 is a schematic diagram showing the configuration of an on-vehicle power supply system according to a first embodiment of the present invention.

As shown in FIG. 1, a vehicle VE is equipped with an on-vehicle power supply system according to the present embodiment. This system functionally realizes both control and calculation apparatuses according to the present invention.

The on-vehicle power supply system is provided with a battery 1, a bi-directional current controller 2, a battery controller 3, and an on-vehicle ECU (electronic control unit) 4.

The battery 1 is electrically connected with a power-supplying line 5 via the bidirectional current controller 2 and also electrically connected with on-vehicle electric loads L and an on-vehicle generator 7 via the power-supplying line 5. The present on-vehicle power supply system is also provided with a current sensor 6 to detect charge current and discharge current to and from the battery 1. The charge and discharge currents I are fed to the current controller 3 via a path 6A. The voltage V of the battery 1 is also fed to the current controller 3 via the path 6A. The power voltage VL, which is the voltage on the power-supplying line 5, is also supplied to the current controller 3. The current controller 3 is configured to accept, from the on-vehicle ECU 4, a target value Va (also called "control voltage" at which the power voltage VL should be controlled) for the power voltage VL.

That is, the signals of the voltage V and current I (voltage/current) of the battery 1, the power voltage VL, and the target value Va, which are input parameters, are used in the current controller 3 with a microcomputer incorporated. Thus, the current controller 3 uses the target value Va to control of the charge and discharge currents to and from the battery 1 via the bi-directional current controller 2. This control allows the power voltage VL to converge to the target value Va, resulting in that the power voltage VL is controlled on the stabilized basis (i.e., the power-voltage stabilizing control).

The bidirectional current controller 2 is formed into a circuit provided with switching elements, which are controlled in a switching controlled manner so as to control the charge and discharge currents to and from the battery 1 to the control current Is.

In the following description, since the charge and discharge currents to and from the battery 1 are controlled under the operations of the bi-directional current controller 2, those charge and discharge currents are also called "control current Is (i.e., target value for the current to and from the battery)," which is paired with the "control voltage Va (i.e., target value for the power voltage)" in terms of their terms.

Figure 2:
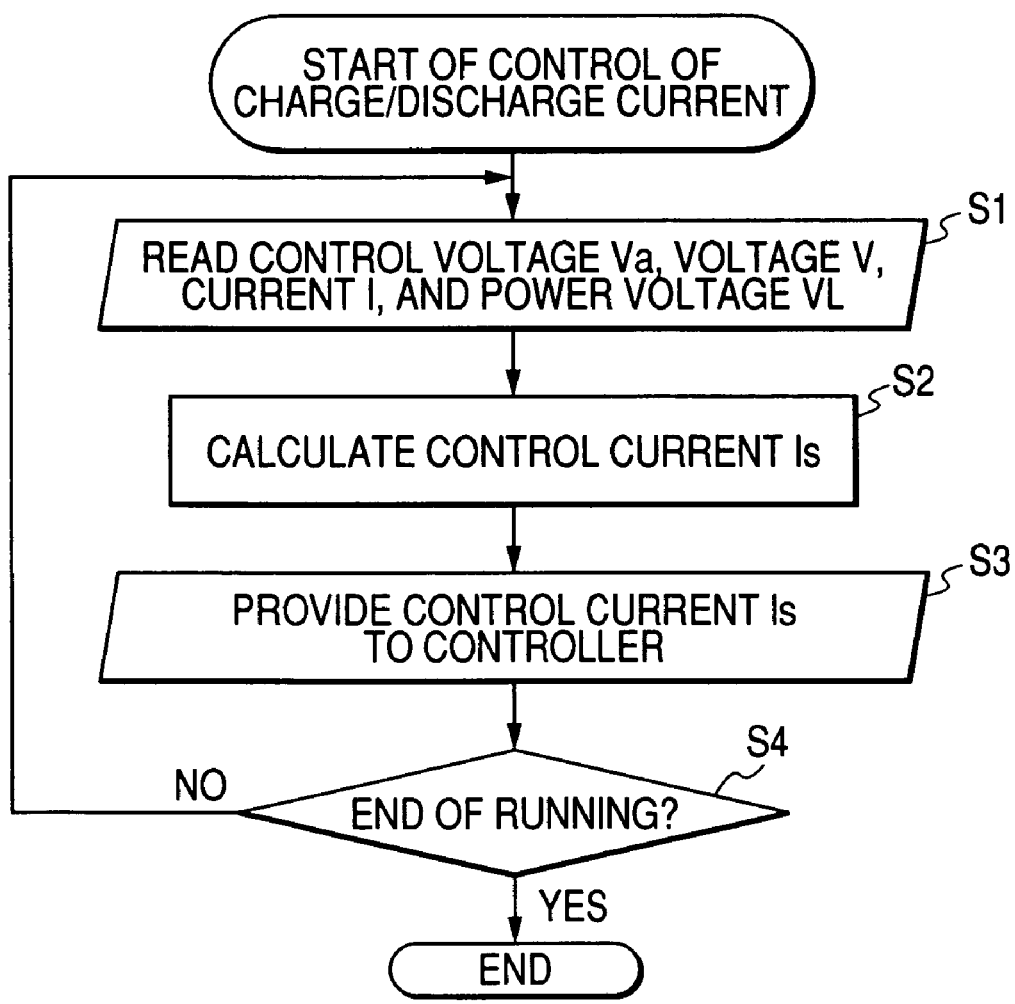
FIG. 2 is a flowchart outlining the processing carried out by a battery controller in the first embodiment.

Referring to FIG. 2, the operations for realizing the power-voltage stabilizing control will now be described, which is carried out by the battery controller 3.

First of all, the battery controller 3 reads in the signals of voltage V and current I (sampled voltage/current pair data) of the battery 1, control voltage Va, and actual power voltage VL which is voltage on the power-supplying line 5 (step S1). Then the battery controller 3 applies the value of the control voltage Va to a relationship between the voltage and current of the battery 1 and calculate the control current Is corresponding to the control voltage Va (step S2). The relationship is memorized in the controller 3 beforehand or produced in the current processing. The battery controller 3 the provides the calculated control current Is to the bidirectional current controller 2 (step S3). Responsively, the bidirectional current controller 2 performs switching control on the control current Is such that the charge and discharge currents to and from the battery 1 is controlled to the control current Is.

Then the battery controller 3 determines whether or not the vehicle has ended its running operation (step S4). If the determination is YES, i.e., the running of the vehicle has stopped, the processing is ended, while if the determination is NO, the vehicle is still in running operation, the processing in the battery controller 3 is returned to step S1.

Figure 3:
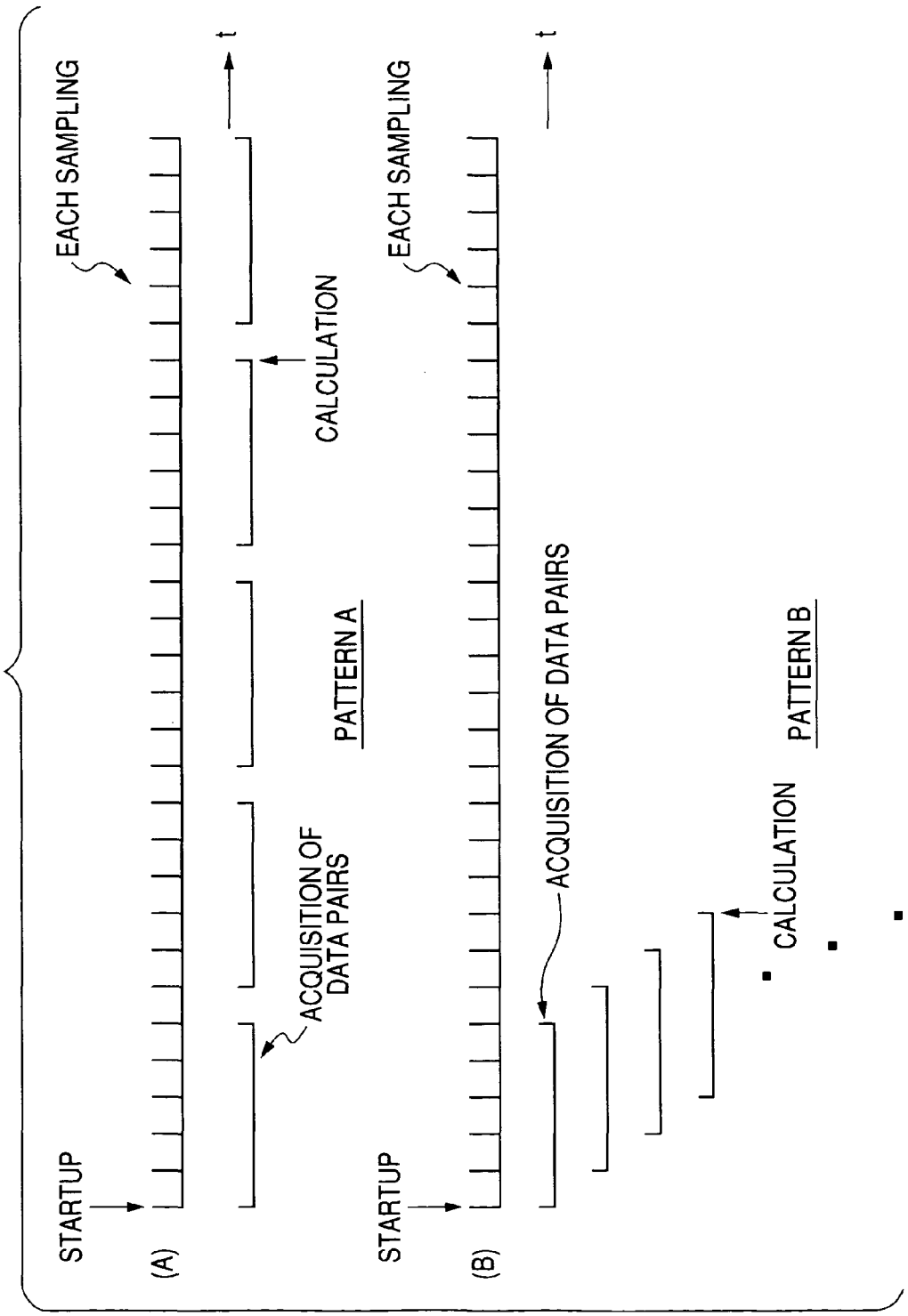
FIG. 3 is a timing chart showing sampling of voltage and current of a battery and calculation in the battery controller.

By the way, for obtaining a function for calculating the foregoing control current Is, the battery controller 3 is given an interrupt routine to be carried out at intervals or in predetermined battery state. Such intervals are exemplified in FIG. 3 as calculation timing, in which a pattern A (FIG. 3(A)) and a pattern B (FIG. 3(B)) exemplify, together with the calculation timing (i.e., timing for carrying out the interrupt routine shown in FIG. 2), intervals of sampling (i.e., acquiring) data pairs of voltage and current. The timing schemes for the data acquisition and the calculation, which are shown as the patterns A and B in FIG. 3, are simply examples, so that the timing scheme may be developed into other various ways.

The interrupt routine shown in FIG. 2 is designed so that the routine uses input information to select a function for calculating the control current Is, the function being set to have less calculation error. Thus, to be specific, the processing at step S2 is reading of the value of the control current Is selected by the interrupt routine.

Figure 4:
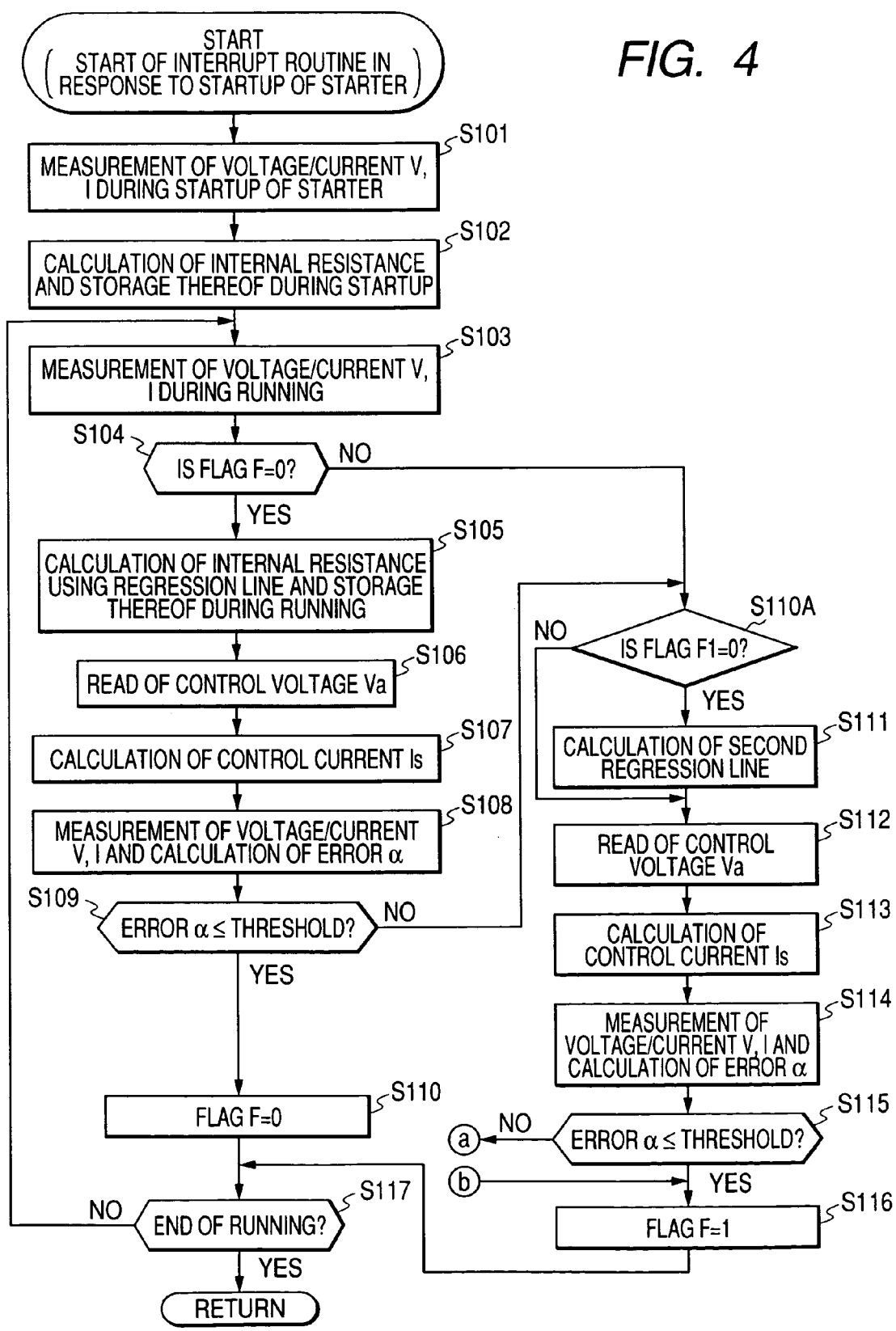
FIGS. 4-6 are flowcharts each outlining the processing carried out by a battery controller in the first embodiment.

Referring to FIG. 4, how to calculate the control current Is, which is carried out at step S2, will now be described. This processing is also carried out repeatedly at intervals.

This calculation is made by using a regression line defined by a plurality of calculating functions (i.e., a formula for calculating the control current Is), that is, regression formulae. A preferred one among the calculating functions is selected depending on conditions and the selected one is subjected to the calculation of the control current Is. In addition, calculation of a new calculating function includes correction of the past calculating functions depending on battery states, other than addition of the current values of the sampled voltage/current pairs.

As shown in FIG. 4, in a regular interrupt manner, the calculation routine is initiated in response to the startup of a starter for the engine. When the starter is started to be driven, the current flowing from and in the battery 1 fluctuates largely during a very short interval of time, during which time a large number of pairs of sampled voltage/current data are measured (step S101). These paired data, which have been measured during the engine startup interval, are used to calculate an internal resistance R of the battery 1 for their storage (step S102).

Figure 5:
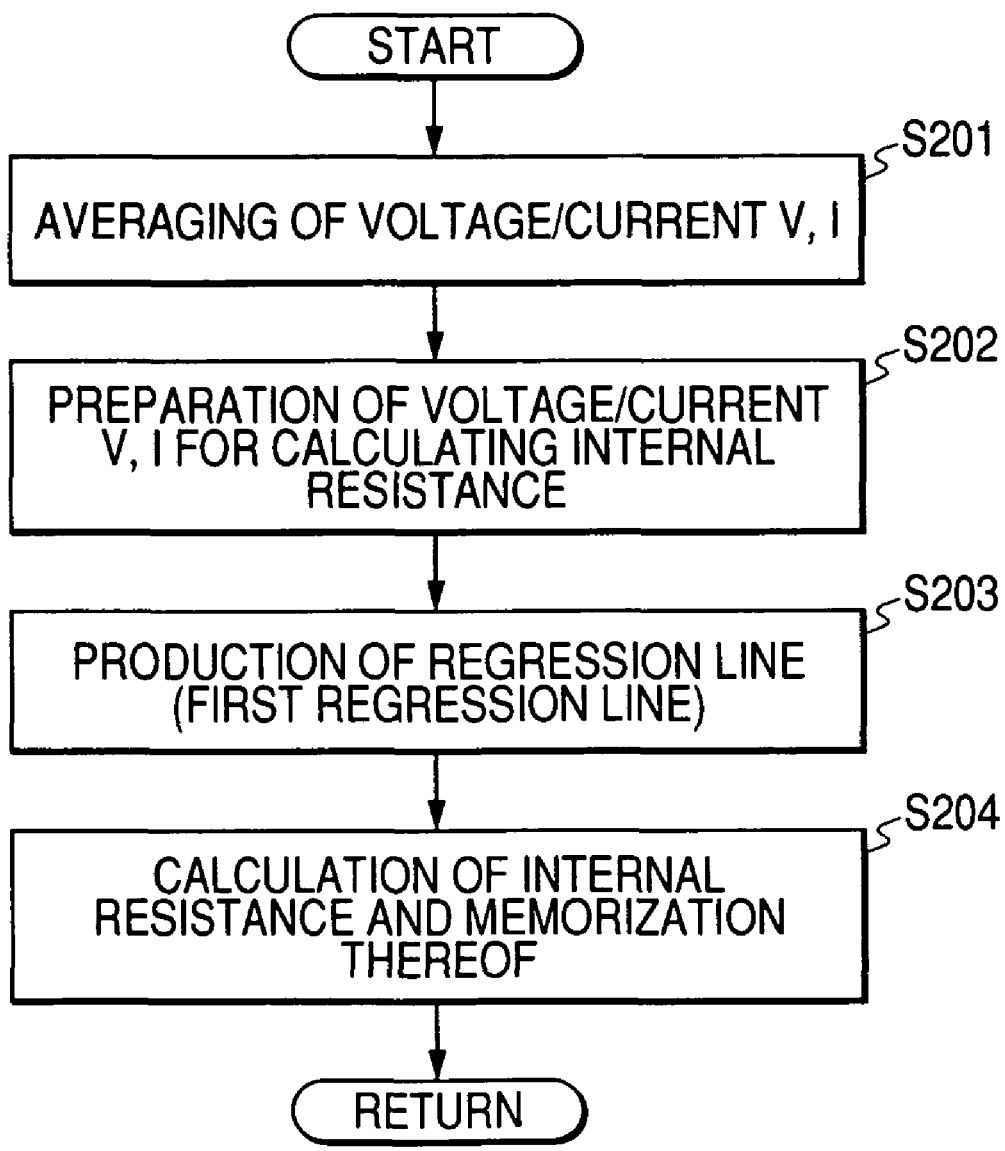

The calculation of the internal resistance R at step S102 will now be detailed more with reference to FIG. 5. This calculation is also executed by the battery controller 3.

The large number of pairs of sampled voltage/current data is first subjected to their average, so that noise components caused and involved in the data are removed or lessened (step S201). Then pairs of sampled voltage/current data are prepared for calculating the internal resistance R of the battery 1 (step S202). Specifically, pairs of sampled voltage/current data to be assigned to the calculation are selected from the sampled voltage/current pair data measured (measured) when inrush current first flows into the starter. Those pairs of sampled voltage/current data to be assigned to the calculation are defined as being data collected in a voltage recovery state coming after a voltage lowest limit caused after the inrush current state. The reason why such selection is made is that the data measurement and acquisition operation is stable and a difference between an estimated voltage (the voltage drops at the startup of the starter, i.e., the engine) and an actually measured voltage becomes a minimum so that there is provided current and voltage ranges for the calculation of the internal resistance. Then the selected pairs of voltage/current data undergo a known calculation technique to produce a first regression line (a regression line during the startup) (step S203), and the slope angle of the first regression line is calculated as an internal resistance of the battery 1 for memorization (step S204).

After this preparation, responsively to start of the running of the vehicle, the battery controller 3 also starts to sample pairs of voltage/current data (FIG. 4, step S103). The battery controller 3 then examines whether or not a flag F for selecting how to calculate the control current Is is 0 (step S104). In the following, this calculation technique will now be referred to as a first calculation technique which allows the control current Is to be calculated based on the internal resistance R.

The value "0" of this flag F means that the control current Is is calculated based on the first calculation technique, of which procedures are shown in steps S105 to S107 later described. Meanwhile, the value "1" of the flag F means that the control current Is is calculated based on a second calculation technique, of which is procedures are shown in steps S111 to S113 later described. This second calculation technique allows the control current Is to be calculated based on the regression line. The flag F is reset to 0 by an initialization process being executed immediately after the routine processing starts, that is, immediately after the running start. Thus, immediately after the running start, the processing proceeds to step S105 from step S104.

At step S105, the sampled voltage/current pair data measured during a selected part of the running interval are also subjected to production of a regression line (i.e., a regression line during the running) in the same manner as that at step S102, this regression line is used to calculate its slope as an internal resistance R, and the data of the internal resistance R is memorized. By the way, the regression line during the startup may be used as this regression line during the running, if it has been unable to measure sampled voltage/current pair data whose dispersion is sufficient for accurately estimating a regression line. For example, this is true of a case where there is less changes in current and voltage of the battery 1 during the running.

Then the battery controller 3 reads in, from the on-vehicle ECU 4, the control voltage Va which is a target value for the power voltage VL of the power-supplying line 5 (step S106). The read control voltage Va and the internal resistance R calculated at step S105 both are subjected to calculation of a control current Is, that is, a target value for the charge/discharged current of the battery 1 (step S107). The resultant control current Is is sent to the bidirectional current controller 2 by way of a command expressing the control current Is, with the result that the charge/discharge current of the battery 1 is controlled at the calculated control Is (target value). This control current Is is calculated on the following formula.

$$Is=(V-Va)/R,$$

where V is a battery voltage measured immediately before the calculation of the control current Is.

Incidentally, in the formula, the internal resistance of the bidirectional current controller 2 is ignored as being relatively smaller than that of the battery 1. This comes from the fact that the bidirectional current controller 2 is equipped with a switching regulator which is made open/close selectively depending on a specified duty every predetermined interval. Hence the resistance loss during the close operation (current flows) is small enough to be ignored.

Then the battery controller 3 measures sampled voltage/current data in pairs again and calculates a voltage error $\alpha$ between the measured voltage V and the control voltage Va (step S108). The battery controller 3 determines whether or not this voltage error $\alpha$ is equal to or less than a predetermined threshold (step S109). This threshold is for determining an allowable voltage range.

When this determination is YES, that is, the voltage error $\alpha \leq$ predetermined threshold, it is recognized that the currently employed calculation technique for the control current Is is proper because the error is smaller and that this calculation technique should be kept. Hence the battery controller 3 continuously gives 0 to the flag F in odder to continuously employ the second calculation technique that uses the regression line during the running, as shown in steps S103 to S107 (step S110). After this flag processing, it is determined whether or not the running has ended (step S117). When the running has ended, the routine is returned to a not-shown main processing, while when the running is kept continuously, the processing is returned to step S103 in the routine.

In contrast, at step S109, if the determination is NO, that is, it is found that the voltage error>the predetermined threshold, the processing proceeds to steps S111 to S115. Of these steps, steps S111 to S113 are assigned to the second calculation technique for the control current Is based on a second regression line.

Specifically, at step S110A, it is determined whether or not a flag F1 is 0. This flag F1 is used to decide that the next step S111 should be skipped or not. Hence, only when it is determined that the flag F1 is 0 (YES at step S110A), the processing at step S111 is conducted.

At step S111, pairs of sampled voltage/current data which are different from those selected at step S105 are also selected from the pairs of the sampled voltage/current data measured at step S103, and then the selected voltage/current pair data are used to calculate a second regression line. The voltage/current pair data used for such a second regression line may be composed of various pair data, such as i) a group of only voltage/current data pairs sampled immediately before the calculation, ii) all data of sampled voltage/current pairs measured, or iii) data of sampled voltage/current pairs already measured in a drive mode of the battery 1 which is similar or identical to the present drive mode of the battery 1.

Such a similar or identical drive mode may be decided depending on states of the charge/discharge currents or residual capacities. For instance, the states of the charge/discharge currents are divided into four states consisting of a state in which the charge current is on the increase, a state in which the charge current is on the decrease, a state in which the discharge current is on increase, and the discharge current is on the decrease. And the comparison is made state by state to employ data of sampled voltage/current pairs belonging to a state similar or identical to the current charge/discharge current state. Alternatively, data of sampled voltage/current pairs may be employed from previously memorized data when residual capacities to be calculated are similar or identical to those obtained in the past.

The battery controller 3 further reads in data of a control voltage Va from the on-vehicle ECU 4 (step S112). As stated, the control voltage Va is a target value for the power voltage VL on the power-supplying line 5. The read-in control voltage Va is applied to the second regression line obtained at step S111 in such a manner that a control current Is, i.e., a charge/discharge current of the battery 1, is calculated (step S113). This control current Is is given to the bidirectional current controller 2 in the form of a command signal, with the result that the battery 1 is controlled to have the charge/discharge current adjusted to the control current Is.

Then, in the same way as the above, the battery controller 3 measures sampled voltage/current data in pairs again and calculates a voltage error α between the measured voltage V and the control voltage Va (step S114). The battery controller 3 determines whether or not this voltage error α is equal to or less than a predetermined threshold (step S115).

When this determination is YES, that is, the voltage error α≦predetermined threshold, it is recognized that the currently employed calculation technique for the control current Is is proper because the error is smaller and that this calculation technique should be kept. Hence the battery controller 3 continuously gives 1 to the flag F in odder to continuously employ the second calculation technique that uses the regression line during the running, as shown in steps S103, S111 to S113 (step S116). After this flag processing, it is determined whether or not the running has ended (step S117). When the running has ended, the routine is returned to the not-shown main processing, while when the running is kept continuously, the processing is returned to step S103 in the routine.

By the way, at the foregoing step S104, if the determination is made such that the flag F currently shows 1, the processing also proceeds to steps S111 to S115. Hence, in this case, the processing is performed in the same manner as the above on the basis of the flag F=1 showing the second calculation technique for the control current Is based on a second regression line.

Figure 6:
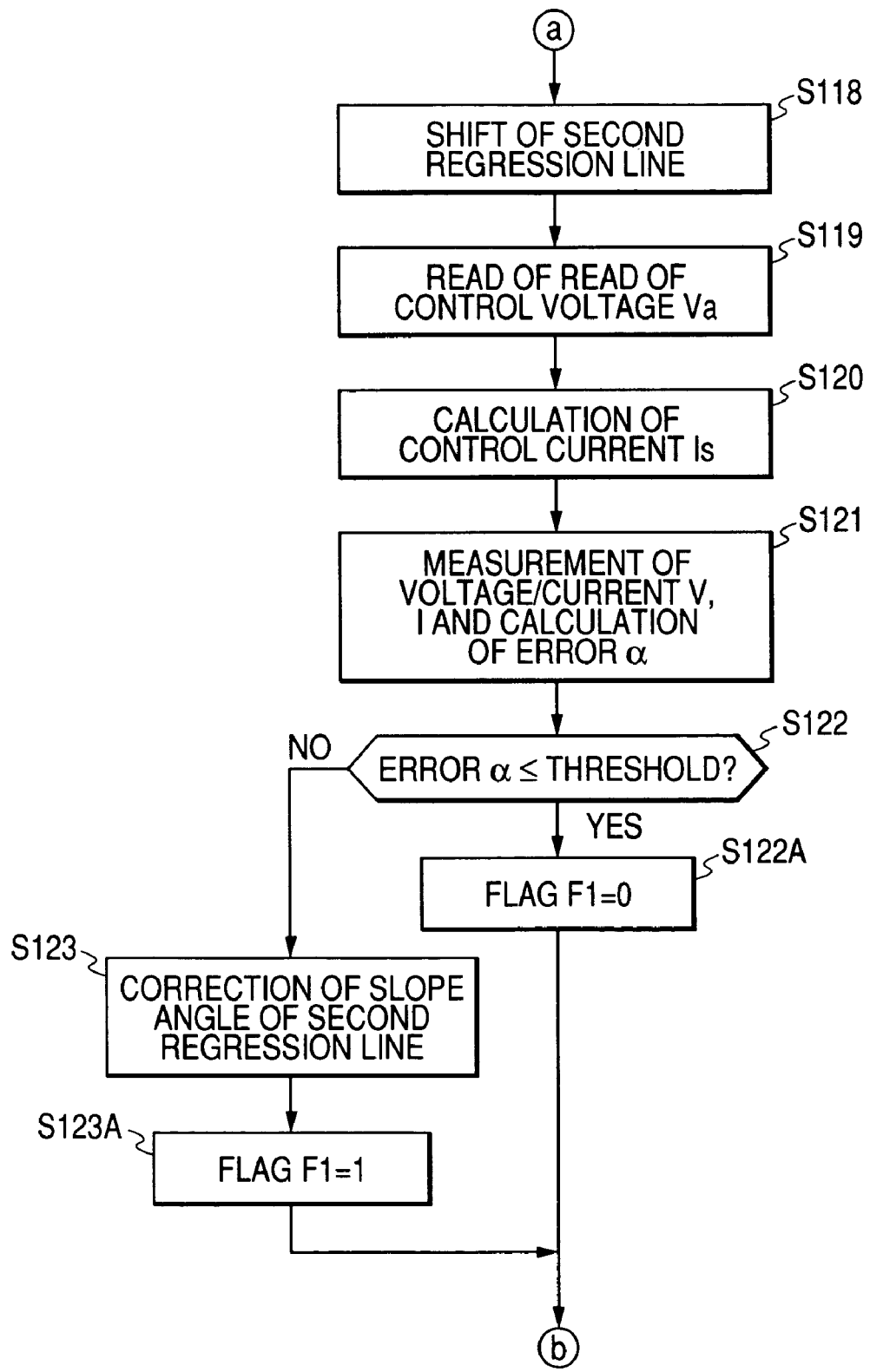

Meanwhile the determination of NO at step S115 causes the processing to proceed to step S118 shown in FIG. 6. That is, when the voltage error α is over the predetermined threshold, it is recognized by the battery controller 3 that the second regression line requires to be corrected further.

At step S118 in FIG. 6, for correcting the regression line, the second regression line calculated at step S111 is shifted in parallel with a line passing a coordinate (Vx, Ix) which is a pair of voltage/current sampled immediately before the calculation. The shifted line is defined as a third regression line (simply, a shifted regression line or a third regression line). That is, the shifted regression line is obtained with a minimum shift distance, compared to the way of shifting the line in parallel with either the voltage or current axis.

Then a control voltage Va is read in (step S119), and this read-in control voltage Va is applied to the shifted regression line to calculate a corrected control current Ia (step S120). This calculation is conducted on the following formula;

$$Is=(Vx-Va)/R+Ix,$$

where R is a slope of the second regression line, which is an internal resistance R.

Then, in the same way as the above, the battery controller 3 measures sampled voltage/current data in pairs again and calculates a voltage error α between the measured voltages V and the control voltage Va (step S121). The battery controller 3 determines whether or not this voltage error α is equal to or less than a predetermined threshold (step S122).

When this determination is YES, that is, the voltage error α≦predetermined threshold, it is recognized that the currently employed calculation technique for the control current Is is proper because the error is smaller and that this calculation technique should be kept. Hence the flag F1=0 is kept (step S122A). Then the battery controller 3 shifts its processing to step S116. In contrast, the determination at step S122 is NO, that is, the voltage error α>predetermined threshold, the processing at step S123 is executed.

At step S123, the battery controller 3 corrects the slope of the third regression line by a little, but predetermined angle in such a manner that the slope angle, i.e., the internal resistance R, is amended to make the voltage error α smaller by a little, but predetermined value. This amendment will now be illustrated in FIG. 7.

Incidentally, after the processing at step S123, the flag F1 is set to F=1 to shown the skip of the processing at step S111 (step S123A).

Figure 7:
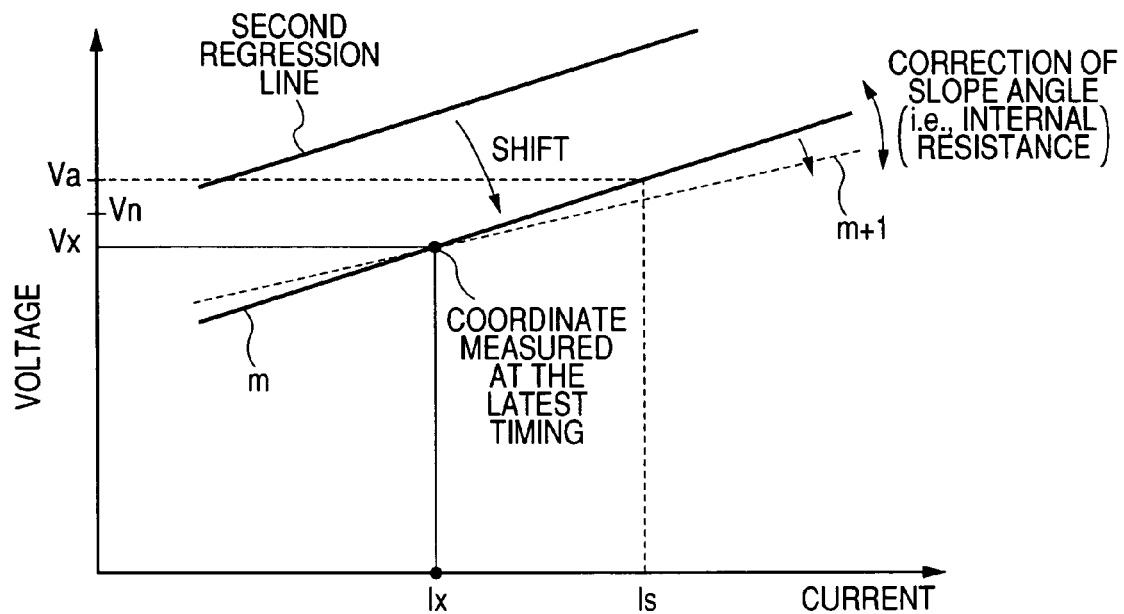
FIG. 7 is a graph explaining a shift operation of a regression line.

In FIG. 7, the second regression line is shifted in parallel to a third regression line passing the coordinate (Vx, Ix) of a voltage/current pair sampled at the latest timing. A control voltage Va is applied to the third regression line to gain a control current Is. This control current Is is used to control (adjust) the actual current of the battery 1, so that an actual voltage Vn is measured after the control. When the actually measured voltage Vn is equal to or smaller than the control voltage Va which is a target value, as shown in FIG. 7, the slope angle of the third regression line is amended so that the control current Is increases. More specifically, the slope angle of the original third regression line "m" is decreased to have a new slope angle, which is assigned to a new third regression line "m+1."

Thanks to the flag processing using the fag F1, this new third regression line whose slope angle is amended by a predetermined value is utilized by the processing at step S112, instead of the second regression line produced at step S111.

By contrast, when the actually measured voltage Vn is higher than the control voltage Va, the slope angle of the third regression line is amended so that the control current Is decreases, that is, the slope angle of the original third regression line "m" is increased to have a new third regression line "m+1."

In this way, the new third regression line "m+1" whose slope angle is adjusted is produced and data indicative of the new one is stored for the control to be carried out thereafter.

As a modification, it is advantageous to stop, at intervals, the correction of the second regression line, which is shown in FIG. 6. Every time the correction is stopped, new voltage/current pairs which have been sampled since the last production of the second regression line at step S112 are used to update the second regression line, which is new and timely so that the present running conditions are reflected in a new updated second regression line.

(Main Advantages)

In the on-vehicle power supply system according to the present embodiment, the power voltage VL on the power-supplying line 5, which fluctuates largely in reply to running conditions of the vehicle, is controlled by controlling the charge/discharge current of the battery 1 at a time-dependently adjusted target value. This makes it possible for the power voltage to be finely and timely adjusted in consideration of the internal charge state of the battery 1. Accordingly, control can be done with higher precision thanks to control based on a timely manner as well as consideration of the internal conditions of the battery 1 which changes time to time during the running state of the vehicle.

Further, compared to the conventional feedback control that controls a generated power amount depending on a difference between an actual power voltage and a target voltage, the control is quicker in response and more effective. The reason is that the power voltage is adjusted in consideration of changes in the internal state of the battery that changes on the control.

Especially in the present embodiment, in cases where the voltage error is still larger (refer to step S115), the regression line showing a relationship between the voltages and currents is shifted from the second one to a third one passing a coordinate of a voltage/current pair sampled at the latest timing (refer to step S118). Correcting or shifting the regression line in this way reduces an error in calculating the control current Is which is a target value.

That is, the latest internal state of the battery can well be reflected into the shifted regression line, thus the battery state being calculated at a high precision with the calculation error reduced largely.

Further, the regression line can be updated. When a calculation error is larger than the threshold, that is, an allowable range, another regression line is calculated on voltage/current pair data sampled differently from those used for calculation of the currently used regression line or another regression line is calculated using a technique different from that for the currently used regression line. Accordingly, an error of the calculation of the control current can be reduced, leading to fine control of the power voltage.

It is also possible that when a calculation error is larger than the threshold, the regression line is corrected for the next calculation. That is, the slope angle (internal resistance) of the regression line is corrected to make the calculation error smaller. Hence, the calculation error is reduced in the next control, so that the control is timely corrected to have the error converged within an allowable range.

That is, the regression line can be switched to another one in a simple manner. Although the regression line depends on voltage/current data pairs acquired in the past, it is not always true that the regression line accurately reflects the present internal state of the battery 1, because such data pairs are sampled at different time instants in different internal states of the battery 1. In the present embodiment, however, the next regression line is selected to be the next one when the calculation error $\alpha$ exceeds a predetermined threshold, which leads to a simple switchover among the regression lines, which further leads to a simple correction of the present regression line.

(Modifications)

The configuration of the on-vehicle power supply system according to the present embodiment may still be modified into further various forms.

Figure 8:
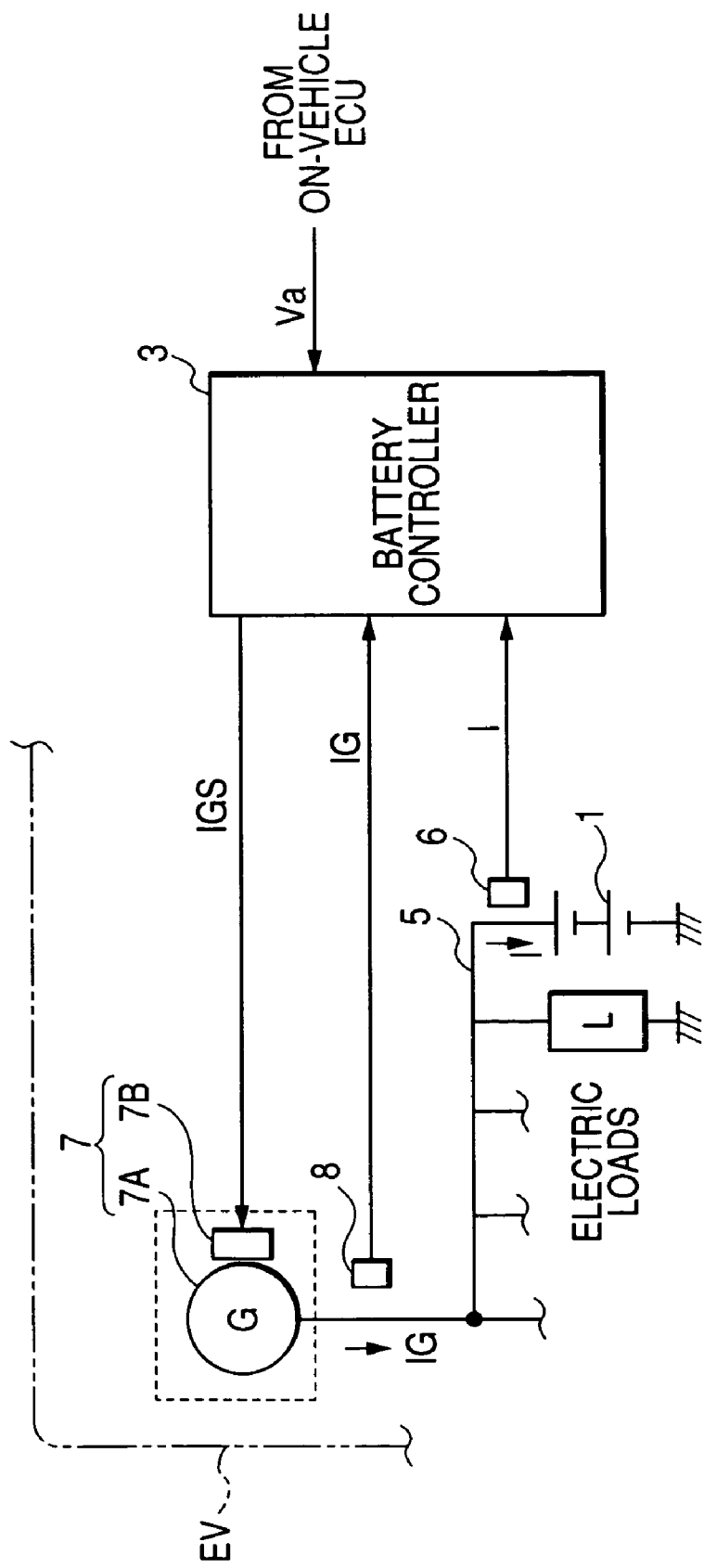
FIG. 8 is a schematic diagram showing the configuration of an on-vehicle power supply system according to a modification of the first embodiment.

The circuitry shown in FIG. 1 may be modified into other forms, one of which is illustrated in FIG. 8. As shown in FIG. 8, an on-vehicle power supply system according the present modification relates to omission of the foregoing bidirectional current controller 2. In this circuitry, the control of the charge and discharge currents of the battery 1 is shifted to a generator system 7 in which there are provided a generator 7A itself and a regulator 7B, so that the bidirectional current controller 2 can be omitted from the circuitry. A current sensor 8 senses a generator current IG and supply it to the battery controller 3. In contrast, in the case of FIG. 1, it is required to have the bidirectional current controller 2 which is responsible for such control.

In the circuitry shown in FIG. 8, the power-voltage stabilizing control will be carried out as follows. The current controller 3 reads in signals of not only the voltage V (=power voltage VL) and current I of the battery 1 but also an output current (corresponding to a current to be generated) IG from the generator 7A via the current sensor 8. Then the battery controller 3 applies the value of the control voltage Va to a relationship between the voltage and current of the battery 1 and calculate the control current Is corresponding to the control voltage Va. Then the battery controller 3 uses the control current Is, the output current IG, an actually measured current I of the battery 1 to calculate the value of a current IGS to be generated (outputted) next from the generator 7A on the following expression:

$$IGS=(IG-I)+Is$$

In this expression, the term "IG-I" means the sum of consumed currents by the on-vehicle electric loads. Thus, on this expression, a command for the current IGS to be generated is given to the regulator 7B so that the current IG to be generated next is made to equal the sum of the current total "IG-I" and present control current "Is". The regulator 7B receives the command for the current IGS to be generated, calculates the value of a field current corresponding to the commanded current IGS, and supplies field current on the calculated field current value to a field coil of the generator 7A. Accordingly, in the similar way to that shown in FIG. 1, the on-vehicle power voltage is controlled in consideration of the characteristics (i.e., states) inherent to each battery 1.

Other various modified forms can be provided as follows.

Though the foregoing embodiment has been explained about a case in which the formula for calculating the control current Is employs the regression line, but is not a decisive one. Another example is that a number of voltage/current pairs are plotted to produce a regression curve of a predetermined curvature in the two dimensional plane and this regression curve is used to calculate the control current Is by substituting a target voltage into the regression curve. Still another example is to use the foregoing regression curve such that a current value expressed by a coordinate at which a tangential line at an actually-measured-point coordinate intersects a line showing a target voltage is set as the control current Is.

In addition, the foregoing embodiment adopts a linear regression line, but this is not a definitive list. Non-linear regression curves can be adopted as well. Further, for shifting the regression curve to a coordinate sampled at the latest timing, it is preferred that the regression curve is shifted twice, i.e., one along the voltage axis and the other along the current axis, so that the shifted distances become a minimum in the two-dimensional coordinate system.

According to the foregoing embodiment and modifications, there are other additional advantages.

The value of the control current is changed using the regression line to be updated at predetermined timing, so that the power voltage is able to converge to a target voltage in an accurate manner. Preferably, the update timing is set to be in a period of time during the current changes largely at a rapid rate. When the current does not change for a long period of time, the regression line may be updated using a large number of paired data of voltage and current acquired in the past.

When the regression line is linear, shifting the regression lines can be done by drawing a liner line passing a coordinate defined by the latest-acquired data pair at a slope angle of the latest one. The second regression line is shifted to the third one so as to keep a shifted distance at a minimum amount. Hence, an amount of the shift can be made smaller, further reducing the calculation error.

The charge/discharge current of the battery 1 is calculated at a coordinate at which the shifted regression line intersects with a liner line showing the target voltage of the battery 1. Thus the value of an updated charge/discharge current of the battery 1, which is necessary for the target voltage, can be estimated reliably, leading to accurate controlling of vehicle power voltage.

In contrast, the voltage of the battery 1 is calculated at a coordinate at which the shifted regression line intersects with a liner line showing the current of the battery 1, so that a battery voltage corresponding to a predetermined charge/discharge current can be detected with precision. When setting the predetermined charge/discharge current to zero, the open-circuit voltage of the battery 1 can be estimated accurately.

Second Embodiment

Referring to FIGS. 9-12, a second embodiment of the on-vehicle power supply system according to the present invention will now be described. In the present embodiment, for the sake of a simplified and redundancy-avoided explanation, the similar or identical components to those in the first embodiment will be given the same reference numerals as those in the first embodiment.

The second embodiment is characteristic of deciding a regression line on the basis of various drive modes of the battery 1.

In the present embodiment, for deciding a particular regression line, there are provided in advance four regression lines, which are composed of i) a discharge-current increasing regression line, ii) a discharge-current decreasing regression line, iii) a charge-current increasing regression line, and iv) a charge-current decreasing regression line. Of these, the discharge-current increasing regression line is used when the battery 1 is in discharge and the discharge current is on the increase. The discharge-current decreasing regression line is used when the battery 1 is in discharge and the discharge current is on the decrease. The charge-current increasing regression line is used when the battery 1 is in charge and the charge current is on the increase. And the charge-current decreasing regression line is used when the battery 1 is in charge and the charge current is on the decrease. Further, it is examined in which drive mode the battery 1 works at present. A particular regression line is chosen among the previously prepared four lines in accordance with the present drive mode of the battery 1, with the chosen regression line used for the control.

Figure 9:
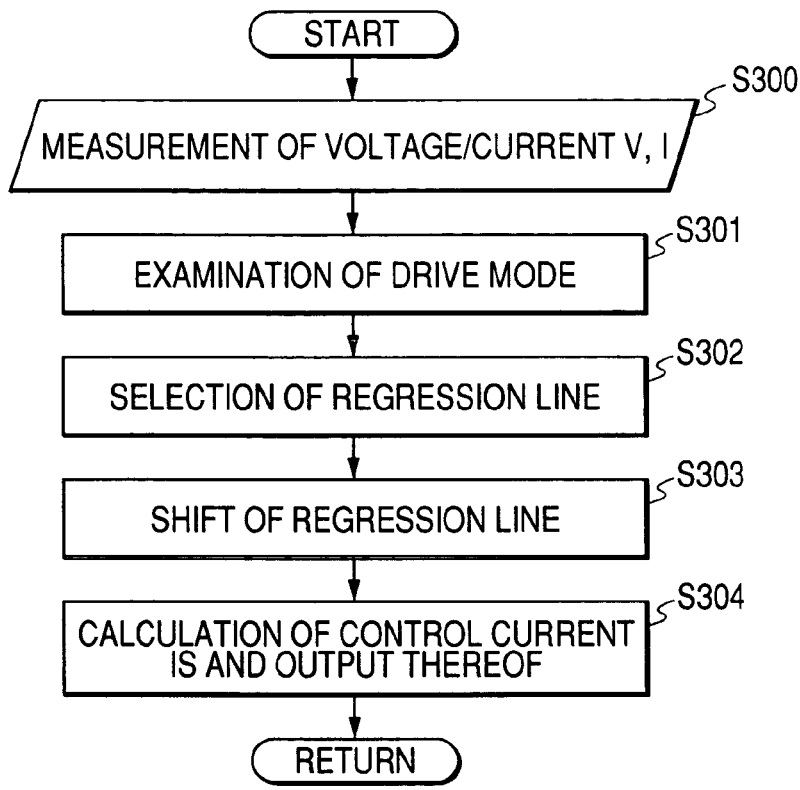
FIGS. 9 and 10 are flowcharts each outlining the processing carried out by a battery controller in a second embodiment according to the present invention.

Referring to FIG. 9, the processing carried out by the battery controller 3 will now be outlined. This processing is also carried out repeatedly at intervals based on for example the patterns A or B shown in FIG. 3.

First of all, data of sampled voltage/current pairs are measured (i.e., detected or acquired) during the latest interval of time (step S300). Using the plurality of pairs of voltage/current data measured during the latest interval of time, the present drive mode of the battery 1 is examined (step S301). In the present embodiment, the drive mode is composed of four modes consisting of a discharge-current increasing mode, discharge-current decreasing mode, charge-current increasing mode, and charge-current decreasing mode.

Then, a signal regression line which accords with the drive mode examined at step S301 is selected from the four regression lines previously memorized, mode by mode (step S303). These four regression lines are discharge-current increasing, discharge-current decreasing, charge-current increasing, and charge-current decreasing regression lines.

Using a known technique, the regression line selected this time is shifted to a line passing a coordinate indicative of a voltage/current pair data measured at the latest sampling timing (step S303). To be specific, a line passing a coordinate of a voltage/current pair data measured the latest sampling timing and also having a slope angle of the selected regression line is drawn in the two-dimensional plane defined by two axes representing the voltage and current.

A current value at a specified coordinate existing along the drawn regression line is decided as a control current Is and outputted in the form of a control command, the specified coordinate corresponding to a target voltage (step S304).

Figure 10:
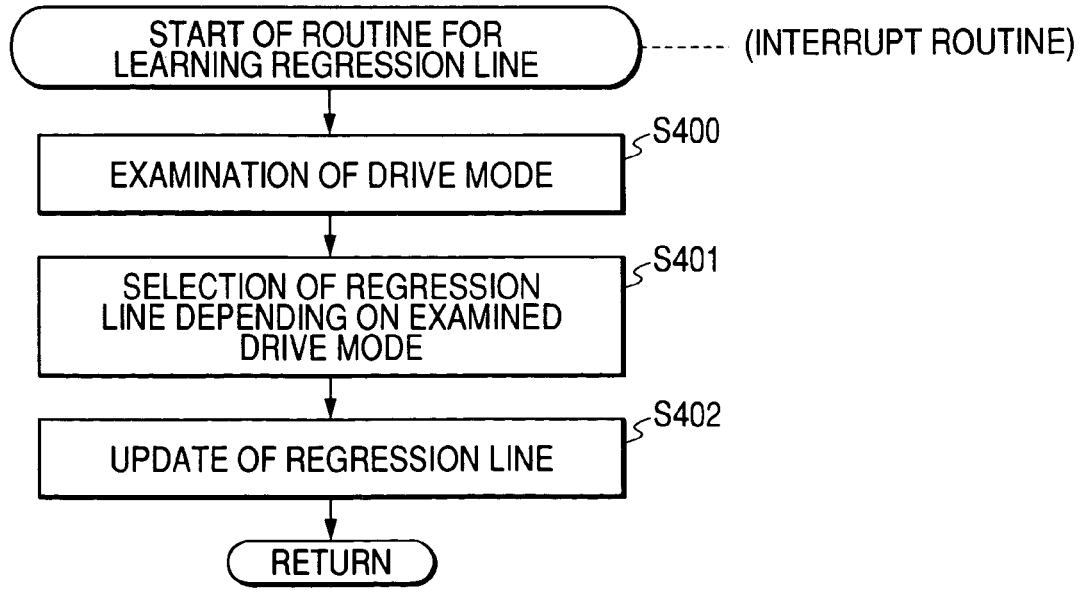
Figure 11:
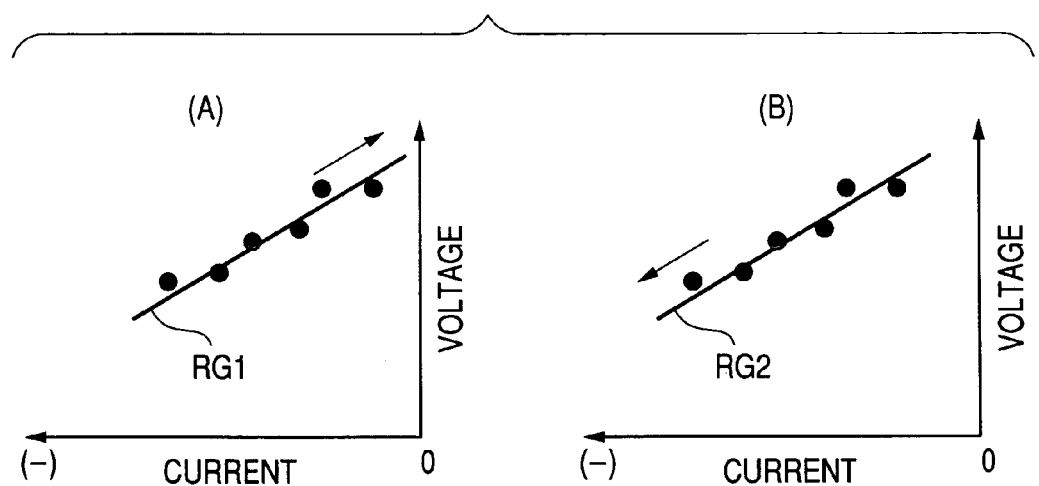
FIGS. 11 and 12 illustrate previously set and determined various regression lines which are subjected to selection in the second embodiment.
Figure 12:
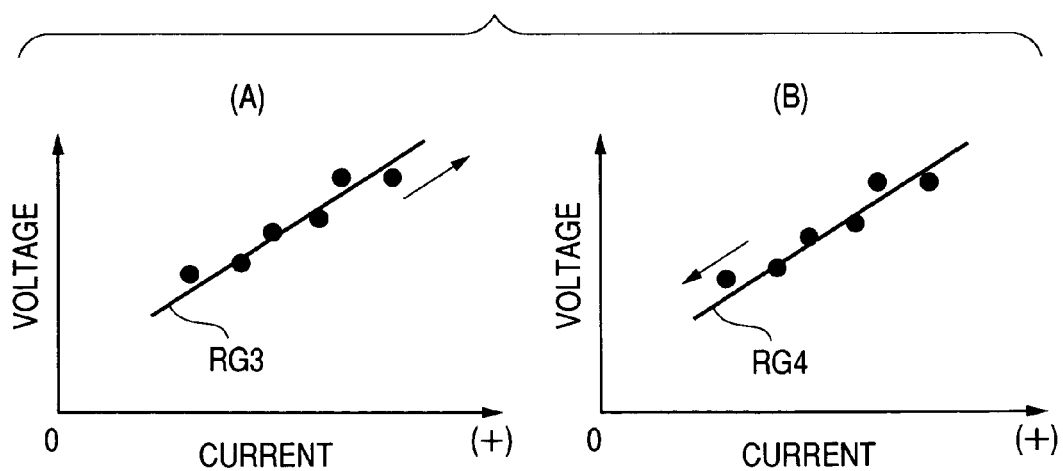

Secondary, referring to FIG. 10, how to produce the four regression lines will now be explained. This processing is also carried out repeatedly as an interrupt routine activated at intervals.

At first, using a plurality of pairs of voltage/current data measured during the latest predetermined interval of time are used to examine a present drive mode of the battery 1 (step S400). Then, a regression line whose mode agrees with the examined drive mode is selected from the already memorized information about the four regression lines, i.e., the discharge-current increasing regression line RG1 as illustrated in FIG. 11(A), the discharge-current decreasing regression line RG2 as illustrated in FIG. 11(B), the charge-current increasing regression line RG3 as illustrated in FIG. 12(A), and the charge-current decreasing regression line RG4 as illustrated in FIG. 12(B) (step S401). The gradient angles of the respective regression lines RG1 to RG4 are the same or different from each other. And the regression line which has been used so far is update to the new one selected this time (step S402).

The update of the regression line will now be explained more with taking as an example the discharge-current increasing regression line. The pairs of sampled voltage/current data measured in the past are grouped into the four drive modes. A plurality of pairs of voltage/current data sampled during the latest predetermined interval are mixed with the voltage/current paired data grouped so far in the same drive mode (in this example, the discharge-current increasing drive mode) to update the regression line to have a new characteristic curve, i.e., a new line, in this drive mode. Hence the regression lines for the four modes are updated constantly and memorized for the control. Of course, the other regression lines for the other modes can be updated in the same manner.

Incidentally, for mixing the new data with the old ones, it is possible to exclude the voltage/current pair data sampled in the oldest interval from the existing data. This exclusion of the old data always keeps the data fresh, so that the regression line can be estimated with precision. In addition, there is another way of calculating the regression lines, in which one regression line which has been used so far is combined with voltage/current paired data to be added this time so that a regression line is figured out by computation.

In this way, it is possible to largely improve an error in calculating the control current Is, because the regression line entitled to be used for calculating the control current Is is produced in the same drive as that of battery 1. In particular, it is possible to distinctively use the different types of regression lines in accordance with different battery-current states which exhibit different voltage/current characteristics of the battery 1. Such sates are due to influence of the polarization caused within in the battery 1, for example. However, the different types of regression lines are distinctively used, reducing an error in the calculation of the control current.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An apparatus for controlling a voltage of power on a power-supplying line extending from an on-vehicle generator and connecting to an on-vehicle battery and on-vehicle eclectic loads, the apparatus being mounted on a vehicle, the apparatus comprising:
    a detecting device detecting pairs of voltage and current of the battery repeatedly at intervals;
    a calculator calculating a control current based on the detected pairs of voltage and current and a target voltage given to the voltage of the power; and
    a controller controlling a charge and discharge current of the battery based on the control current such that the voltage of the power is controlled at the target voltage,
    wherein the calculator is provided with
    internal resistance obtaining means for obtaining an internal resistance of the battery based on the pairs of voltage and current;
    first calculating means for calculating a value of the control current based on the target voltage and the internal resistance;
    first providing means for providing the control current as a command to the controller;
    first determining means for determining whether or not an error between an actual voltage of the battery and the target voltage is within an allowable range;
    regression line obtaining means for obtaining a regression line defining a relationship between the voltage and the current of the battery by using the pairs of voltage and current if it is determined by the first determining means that the error is within the allowable range;
    second calculating means for re-calculating a value of the control current based on the target voltage and the regression line; and
    second providing means for re-providing the control current as the command to the controller.

2. The apparatus of claim 1, wherein the calculator is provided with
    second determining means for re-determining whether or not the error between the actual voltage of the battery and the target voltage is within the allowable range;
    shifting means for shifting the regression line to a further regression line based on a latest pair of voltage and current among the measured pairs of voltage and current if it is determined by the second determining means that the error is within the allowable range;
    third calculating means for re-calculating the value of the control current based on the target voltage and the shifted regression line; and
    third providing means for re-providing the control current as command to the controller.

3. The apparatus of claim 2, wherein the calculator is provided with
    third determining means for re-determining whether or not the error between the actual voltage of the battery and the target voltage is within the allowable range;
    amending means for amending a slope of the shifted regression line if it is determined by the third determining means that the error is within the allowable range;
    fourth calculating means for re-calculating the value of the control current based on the target voltage and the shifted and slope-amended regression line; and
    fourth providing means for re-providing the control current as the command to the controller.

4. The apparatus of claim 1, wherein the controller is arranged separately from the generator and arranged to be present in a path connecting the power-supplying line and the battery.

5. The apparatus of claim 1, wherein the controller is arranged in the generator.

6. An apparatus for controlling a voltage of power on a power-supplying line extending from an on-vehicle generator and connecting to an on-vehicle battery and on-vehicle eclectic loads, the apparatus being mounted on a vehicle, the apparatus comprising:
    a detecting device detecting pairs of voltage and current of the battery repeatedly at intervals;
    a calculator calculating a control current based on the detected pairs of voltage and current and a target voltage given to the voltage of the power; and
    a controller controlling a charge and discharge current of the battery based on the control current such that the voltage of the power is controlled at the target voltage,
    the calculator is provided with first obtaining means for obtaining a regression line defining a relationship between the voltage and the current of the battery based on the pairs of voltage and current and the target voltage;

first calculating means for calculating a value of the control current based on the target voltage and the regression line;

first providing means for providing the control current as a command to the controller;

determining means for determining whether or not an error between an actual voltage of the battery and the target voltage is within an allowable range;

second obtaining means for re-obtaining a further regression line for the battery based on the pairs of voltage and current and the target voltage if it is determined by the determining means that the error is within the allowable range;

second calculating means for calculating a further value of the control current based on the target voltage and the further regression line; and second providing means for re-providing the further control current as a command to the controller.

7. An apparatus for controlling a voltage of power on a power-supplying line extending from an on-vehicle generator and connecting to an on-vehicle battery and on-vehicle eclectic loads, the apparatus being mounted on a vehicle, the apparatus comprising:

a detecting device detecting pairs of voltage and current of the battery repeatedly at intervals;

a calculator calculating a control current on the basis of the detected pairs of voltage and current and a target voltage given to the voltage of the power; and a controller controlling a charge and discharge current of the battery on the basis of the control current such that the voltage of the power is controlled at the target voltage, wherein the calculator includes obtaining means for obtaining a plurality of regression lines each defining a relationship between the voltage and the current of the battery based on the pairs of voltage and current and the target voltage; calculating means for calculating a value of the control current based on a target voltage and at least one of the regression lines;

providing means for providing the control current as a command to the controller;

determining means for determining whether or not an error between an actual voltage of the battery and the target voltage is within an allowable range; and using means for selectively using one of the regression lines in calculating the value of the control current, depending on results determined by the determining means.

8. An apparatus for controlling a voltage of power on a power-supplying line extending from an on-vehicle generator and connecting to an on-vehicle battery and on-vehicle eclectic loads, the apparatus being mounted on a vehicle, the apparatus comprising:

a detecting device detecting pairs of voltage and current of the battery repeatedly at intervals;

a calculator calculating a control current based on the detected pairs of voltage and current and a target voltage given to the voltage of the power; and a controller controlling a charge and discharge current of the battery on the basis of the control current such that the voltage of the power is controlled at the target voltage, wherein the calculator is configured to obtain a regression line defining a relationship between the voltage and the current of the battery based on the pairs of voltage and current and the target voltage; calculate a value of the control current on the basis of the target voltage and the regression line; provide the control current as a command to the controller; determine whether or not an error between an actual voltage of the battery and the target voltage is within an allowable range; and amend the regression line if it is determined the error is not within the allowable range.

9. The apparatus of claim 8, wherein the calculator is configured to amend a slope angle of the regression line in a graph so as to make the error smaller, the pairs of voltage and current being plotted in the graph.

10. An apparatus for calculating an electric quantity indicating a charged state of a battery being mounted on a vehicle, the battery being connected via a line to an on-vehicle generator and on-vehicle electric loads, the apparatus comprising:

a detecting device detecting pairs of voltage and current of the battery repeatedly at intervals; and a calculator configured to calculate a first regression line defining a relationship between the voltage and the current of the battery based on the pairs of voltage and current, determine whether or not the first regression line has accuracy sufficient for calculating the electric quantity; shift the first regression line to a second regression line for the battery based on a latest of voltage and current among the measured pairs of voltage and current if it is determined that the first regression line does not have the accuracy sufficient for calculating the electric quantity; and calculate, as the electric quantity, the current of the battery by applying the voltage of the battery to the second regression line.

11. The apparatus of claim 10, wherein the calculator is configured to shift the first regression line such that a shifted distance from the first regression line to the second regression line is the shortest in a graph in which the pair of voltage and current are plotted.

12. An apparatus for calculating an electric quantity indicating a charged state of a battery being mounted on a vehicle, the battery being connected via a line to an on-vehicle generator and on-vehicle electric loads, the apparatus comprising:

a detecting device detecting pairs of voltage and current of the battery repeatedly at intervals; and a calculator configured to calculate a first regression line defining a relationship between the voltage and the current of the battery based on the pairs of voltage and current, determine whether or not the first regression line has accuracy sufficient for calculating the electric quantity; shift the first regression line to a second regression line based on a latest pair of voltage and current among the measured pairs of voltage and current if it is determined that the first regression line does not have the accuracy sufficient for calculating the electric quantity; and calculate, as the electric quantity, the voltage of the battery by applying the current of the battery to the second regression line.

13. A method of calculating an electric quantity indicating a charged state of a battery being mounted on a vehicle, the battery being connected via a line of an on-vehicle generator and on-vehicle electric loads, the method comprising steps of:

determining whether the battery is either in a discharge state or in a charge state;

selecting one regression line depending on a determined result by the determining step, from a plurality of types of regression lines prepared beforehand depending on whether the battery is in the discharge state or the charge state, each regression line defining a relationship between voltage and current of the battery; and calculating the electric quantity by using the selected one regression line.

14. The method of claim 13, wherein the plurality of types of regression lines are four regression lines consisting of a first regression line used when the battery is in the discharge state and the current of the battery is on the increase, a second regression line used when the battery is in the discharge state and the current of the battery is on the decrease, a third regression line used when the battery is in the charge state and the current of the battery is on the increase, and a fourth regression line used when the battery is in the charge state and the current of the battery is on the decrease.

* * * * *

UNITED STATES PATENT AND TRADEMARK OFFICE
CERTIFICATE OF CORRECTION

| | |
|---|---|
| PATENT NO. | : 7,777,446 B2 |
| APPLICATION NO. | : 11/700183 |
| DATED | : August 17, 2010 |
| INVENTOR(S) | : Kenji Ueda et al. |

It is certified that error appears in the above-identified patent and that said Letters Patent is hereby corrected as shown below:

On the Title page, Item (56)

Please add the following under "FOREIGN PATENT DOCUMENTS"

| | | |
|---|---|---|
| JP | A 11-038105 | 02/1992 |
| KR | 1998-024034 | 07/1998 |

Signed and Sealed this

Seventh Day of December, 2010

David J. Kappos
*Director of the United States Patent and Trademark Office*